United States Patent Office 3,190,810
Patented June 22, 1965

3,190,810
PRODUCTION OF 6-DEMETHYLTETRACYCLINES
Philip Andrew Miller, Valley Cottage, N.Y., assignor to American Cyanamid Company, New York, N.Y., a corporation of Maine
No Drawing. Filed Mar. 6, 1962, Ser. No. 177,753
5 Claims. (Cl. 195—80)

This application is a continuation-in-part of my copending application Serial No. 837,359, filed September 1, 1959, now abandoned.

This invention relates to a novel process of preparing 6-demethyltetracyclines and more particularly is concerned with the biosynthesis of 6-demethyltetracyclines by certain strains of microorganisms of the genus Streptomyces.

The 6-demethyltetracyclines, demethylchlortetracycline (7-chloro-6 - demethyltetracycline), demethylbromtetracycline (7-bromo-6-demethyltetracycline) and 6-demethyltetracycline itself are members of a new family of tetracycline antibiotics which are described and claimed in United States patent to Jerry Robert Daniel McCormick et al. No. 2,878,289. The demethyltetracyclines therein described are produced by certain mutant strains of *Streptomyces aureofaciens* derived from the chlortetracycline-producing *S. aureofaciens* A–377 soil isolate described in United States patent to Duggar, No. 2,482,055 and deposited at the Northern Regional Research Laboratory, Peoria, Illinois, as NRRL 2209. The new demethyltetracycline-producing strains were derived by treatment of A–377 with mutagenic agents. Cultures of the new demethyltetracycline-producing strains of *S. aureofaciens* are on deposit at the American Type Culture Collection, Washington, D.C., under ATCC accession numbers 12551, 12552, 12553 and 12554.

The present invention is based upon the discovery that the 6-demethyltetracyclines can be readily prepared by cultivating under submerged aerobic conditions a conventional chlortetracycline-producing or tetracycline-producing strain of *S. aureofaciens* when the medium is modified to include a small amount of a methylation inhibitor such as dl-ethionine or l-ethionine. The mechanism by which the 6-demethyltetracyclines are produced in a medium to which the ethionine has been added and which is fermented with conventional *S. aureofaciens* strains which ordinarily produce chlortetracycline or tetracycline, is not completely understood and no theory is advanced with respect thereto. It is a demonstrable fact, however, that by the use of the methylation inhibitor in accordance with the present invention the 6-demethyltetracyclines are produced in good yield.

The present invention is not particularly concerned with any specific microorganisms except to the extent that it is concerned with those microorganisms that produce chlortetracycline and tetracycline by fermentative biosynthesis. Insofar as is presently known, all such microorganisms are of the genus Streptomyces. The species *S. aureofaciens*, which produces chlortetracycline in fermentation media in which chloride ions are present as well as numerous natural and induced mutants, is, of course, preferably used and such microorganisms will, of course, also produce tetracycline when deprived of chloride ions. A number of other chlortetracycline-producing microorganisms and tetracycline-producing microorganisms have been mentioned in the patent literature as alleged distinct species of Streptomyces such as *S. viridifaciens, S. sayamaensis, S. feofaciens,* and still others. The published morphological data on these microorganisms is insufficient to determine conclusively whether or not they are new species or merely strains of *S. aureofaciens*. Regardless of this, however, the present invention is not predicated upon the selection of a particular species of microorganism so long as that microorganism will produce both chlortetracycline and tetracycline.

The conditions of the fermentation are generally the same as for the presently known methods of producing tetracycline, and chlortetracycline by fermentation. That is, the fermentation medium contains the usual nutrients and mineral substances. Suitable nutrient substances which may provide those necessary substances include starch, dextrose, cane sugar, glucose, molasses, soybean meal, peanut meal, yeast, meat extracts, peptone, ammonium sulfate, urea, corn steep liquor, distillers solubles, inorganic salts and other conventional substances. The inorganic salts include such things as calcium carbonate, ammonium sulfate, ammonium chloride, and the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of chlortetracycline shown in United States patent to Duggar No. 2,482,055 and for the production of tetracycline shown in United States patent to Minieri et al. No. 2,734,018.

The amount of dl-ethionine or l-ethionine that may be used is a factor of some importance. In general it has been found that amounts of l-ethionine ranging from 0.08 milligrams per milliliter (mg./ml.) to 2.0 mg./ml. and that amounts of dl-ethionine ranging from 0.16 to 4.0 mg./ml. can satisfactorily be used. So far it has not been determined that d-ethionine alone appreciably affects the amount of chloretetracycline or 7-chloro-6-demethyltetracycline that is produced.

The invention will be described in greater detail in conjunction with the following specific examples.

EXAMPLE 1

*Production of 7-chloro-6-demethyltetracycline*

A fermentation medium was prepared according to the following formula:

| | Grams |
|---|---|
| $(NH_4)_2SO_4$ | 5.0 |
| $CaCO_3$ | 9.0 |
| $NH_4Cl$ | 1.5 |
| $MgCl_2 \cdot 6H_2O$ | 2.0 |
| $FeSO_4 \cdot 7H_2O$ | 0.06 |
| $MnSO_4 \cdot 4H_2O$ | 0.05 |
| $CoCl_2 \cdot 6H_2O$ | 0.005 |
| $ZnSO_4 \cdot 7H_2O$ | 0.1 |
| Corn steep liquor | 25.0 |
| Corn starch | 55.0 |

Water to 1000.0 milliliters.

To this medium was added 320 milligrams of dl-ethionine. The medium was dispensed in appropriate amounts into flasks containing 2% (v./v.) of lard oil, sterilized, inoculated with a vegetative inoculum of *S. aureofaciens* (Strain S–77) and incubated at 25° C. on a rotary shaker for 120 hours.

To the 1000 milliliters of fermentation mash thus obtained, there was added 500 milliliters of water. The pH of this mixture was adjusted to 1.5 with sulfuric acid. After the addition of 50 grams of Hyflo the mixture was stirred and filtered and the filtrate saved. The filter cake was reextracted with 1.5 liters of hot (45° C.) water, filtered, and the filtrate saved. The two acid filtrates were then combined, mixed with 18 grams of ammonium oxalate, and stirred for 15 minutes. The pH was raised to 2.5 with 25% sodium hydroxide and stirring again continued for 15 minutes. At the termination of this period of stirring, 7.5 grams of Hyflo were added and the mixture filtered. A 1.0 milliliter portion of Arquad 16 was added to the filtrate. (Arquad 16 is a mixture of alkyl trimethylammonium chloride and dialkyldimethylammonium chloride in which the alkyl groups consist of 90% hexadecyl, 6% octadecyl, and 4% octadecenyl in 50% isopropanol). The pH of the solution was raised to 8.5 with sodium hydroxide, then 150 milliliters of MIBK (methyl isobutyl ketone) was added and the mixture stirred for 20 minutes and allowed to settle for one-half hour before the supernatant MIBK was decanted. A reextraction with another 75 milliliters of MIBK followed and the supernatant MIBK was again decanted. The two decanted volumes of MIBK were combined. A 5.6 gram portion of Hyflo filter aid was added and the mixture stirred and filtered. Four milliliters of water were added to the filtrate, the pH adjusted to 0.7 with concentrated hydrochloric acid, and the liquid aged for 16 hours. The crystals which formed were collected by filtration, then washed with water, 2-ethoxyethanol, and finally with isopropanol. The washed crystals were dried under vacuum for 6 hours at 40° C. A total of 130 milligrams of crude product was obtained. A 4.34 milligram sample of the crude product was dissolved in 0.1 N hydrochloric acid and made up to a 25 milliliter volume. The crude product assayed 85% chlortetracycline, 5% tetrachyline and 10% 7-chloro-6-demethyltetracycline.

EXAMPLE 2

*Production of 7-chloro-6-demethyltetracycline*

The procedure of Example 1 was repeated except that varying quantities of dl-ethionine (0.16, 0.30, 0.50, 1.0, 2.0, and 4.0 mg./ml.) and of l-ethionine (0.08, 0.15, 0.25, 0.50, 1.0, and 2.0 mg./ml.) were added in separate runs. In all instances the formation of 7-chloro-6-demethyltetracycline was observed.

EXAMPLE 3

*Production of 7-chloro-6-demethyltetracycline*

A fermentation medium was prepared according to the following formula:

|  | Grams |
|---|---|
| $(NH_4)_2SO_4$ | 8.0 |
| $CaCO_3$ | 11.0 |
| $NH_4Cl$ | 1.5 |
| $MgCl_2.6H_2O$ | 2.0 |
| $FeSO_4.7H_2O$ | 0.06 |
| $ZnSO_4.7H_2O$ | 0.10 |
| $CoCl_2.6H_2O$ | 0.005 |
| $MnSO_4.4H_2O$ | 0.05 |
| Starch | 55.0 |
| KCl | 1.28 |
| $H_3PO_4$ (85%) | 0.38 |
| l-histidine | 0.8 |
| l-methionine | 0.6 |
| Water to 1000 milliliters. | |

Twenty-five milliliter aliquots of this medium were placed in each of a series of 250-ml. Erlenmeyer flasks containing 2% (v./v.) of lard oil. A specific amount of l-ethionine were added to each flask, with the exception that one flask was retained as a control. The flasks were sterilized, inoculated with a vegetative inoculum of *Streptomyces aureofaciens* (Strain S-77) and incubated at 25° C. for 120 hours. The harvest mash, in each case, was acidulated to pH 1.5 with hydrochloric acid and filtered. The acid mash filtrates were streaked on Whatman No. 1 chromatographic paper buffered to pH 3.0 with 0.3 M $NaH_2PO_4$, developed with n-butanol buffered to pH 3.0, the 7-chloro-6-demethyltetracycline eluted with 0.1 N hydrochloric acid, and assayed. Test values were as follows:

| l-ethionine mg./25 ml.: | 7-chloro-6-demethyltetracycline mcg./ml. of harvest mash |
|---|---|
| 0 | <23 |
| 2 | <23 |
| 4 | 291 |
| 6 | 148 |
| 8 | 82 |
| 10 | 111 |
| 12 | 102 |
| 14 | 121 |
| 16 | 53 |
| 20 | 36 |
| 24 | 57 |
| 32 | 42 |
| 64 | <26 |
| 128 | <15 |
| 256 | 0 |

Thus peak production of 291 mcg./ml. occurs with 4 mg./25 ml. of l-ethionine.

EXAMPLE 4

*Production of 6-demethyltetracycline*

A fermentation medium was prepared according to the following formula:

| | |
|---|---|
| $K_2SO_4$ grams | 1.48 |
| $H_3PO_4$ (85%) do | 0.40 |
| $(NH_4)_2SO_4$ do | 9.84 |
| $CaCO_3$ do | 10.0 |
| Starch (Cl⁻ free) do | 55.0 |
| $MgSO_4.7H_2O$ do | 2.53 |
| $FeSO_4.7H_2O$ do | 0.06 |
| $ZnSO_4.7H_2O$ do | 0.10 |
| $MnSO_4.4H_2O$ do | 0.05 |
| $Co(NO_3)_2.6H_2O$ do | 0.005 |
| l-histidine (base) do | 0.8 |
| Lard oil milliliters | 20.0 |
| Water to 1000 milliliters. | |

Twenty-five milliliter portions of this fermentation medium were placed in two 250-ml. Erlenmeyer flasks. The lard oil included in the formulation was added in the form of a 0.5 milliliter aliquot to each flask. To one of these flasks 4.0 mg. of l-ethionine was added. The two sterilized flasks were inoculated with one milliliter aliquots of a vegetative inoculum of a typical chlortetracycline-producing strain of *S. aureofaciens* and incubated at 25° C. on a rotary shaker for 120 hours. The contents of the flasks were then assayed with the following results:

|  | 6-demethyltetracycline mcg./ml. |
|---|---|
| Test (with l-ethionine) | 25 |
| Control (without l-ethionine) | 0 |

EXAMPLE 5

*Production of 6-demethyltetracycline*

A fermentation medium was prepared according to the formula shown in Example 1. To one half of this medium was added 3.5 mg. of FMOD [2-(2-furyl-5-mercapto-1,3,4-oxadiazole)]. To the other half of this medium was added 3.5 mg. of FMOD plus 160 mg. of dl-ethionine. Both media were dispensed in appropriate amounts into flasks containing 2% (v./v.) of lard oil, sterilized, inoculated with a vegetative inoculum of *Streptomyces aureofaciens* (Strain S-77) and incubate at 25° C. on a rotary shaker for 120 hours and were then tested for antibiotic potency with the following results:

|  | 6-demethyltetracycline mcg./ml. |
|---|---|
| Test (with dl-ethionine) | 40 |
| Control (without dl-ethionine) | 0 |

EXAMPLE 6

Production of 7-bromo-6-demethyltetracycline

A fermentation medium was prepared according to the following formula:

| | | |
|---|---|---|
| $K_2SO_4$ | grams | 1.48 |
| $H_3PO_4$ (85%) | do | 0.40 |
| $(NH_4)_2SO_4$ | do | 9.84 |
| $CaCO_3$ | do | 10.0 |
| Starch ($Cl^-$ free) | do | 55.0 |
| $MgSO_4.7H_2O$ | do | 2.53 |
| $FeSO_4.7H_2O$ | do | 0.06 |
| $ZnSO_4.7H_2O$ | do | 0.10 |
| $MnSO_4.4H_2O$ | do | 0.05 |
| $Co(NO_3)_2.6H_2O$ | do | 0.005 |
| l-histidine (base) | do | 0.8 |
| Lard oil | milliliters | 20.0 |
| Water to 1000 milliliters. | | |

Twenty-five milliliter portions of this fermentation medium were placed in two 250-ml. Erlenmeyer flasks. The lard oil included in the formulation was added in the form of a 0.5 milliliter aliquot to each flask. To one of these flasks 4.0 mg. of l-ethionine was added. The two sterilized flasks were inoculated with one milliliter aliquots of a vegetative inoculum of a typical chlortetracycline-producing strain of *Streptomyces aureofaciens*.

After incubating at 24° C. for 48 hours, 50 microcuries of potassium bromide [82] (1614 millicuries/gram) was added to each flask. After an additional 24 hours of incubation the flasks were removed and their contents assayed for 7-bromo[82]-6-demethyltetracycline by paper chromatography followed by scanning of the developed strips for radioactive zones with a Geiger-Muller counter. A radioactive zone having an RF identical to that of authentic 7-bromo-6-demethyltetracycline was detected in chromatograms of mash A; no such zone was detected for the control mash containing no l-ethionine.

I claim:

1. A process for producing an antibiotic selected from the group consisting of 6-demethyltetracycline, 7-chloro-6-demethyltetracycline and 7-bromo-6-demethyltetracycline which comprises cultivating a chlortetracycline-producing microorganism of the genus Streptomyces capable of producing said antibiotics in an aqueous nutrient medium containing assimilable sources of carbohydrate, nitrogen and inorganic salts under submerged aerobic conditions, said medium having added thereto a small but effective amount of a compound selected from the group consisting of dl-ethionine and l-ethionine.

2. A process for producing 6-demethyltetracycline which comprises cultivating a chlortetracycline-producing micro-organism of the genus Streptomyces capable of producing 6-demethyltetracycline in an aqueous nutrient medium containing assimilable sources of carbohydrate, nitrogen and inorganic salts under submerged aerobic conditions, said medium having added thereto a small but effective amount of a compound selected from the group consisting of dl-ethionine and l-ethionine.

3. A process for producing 7-chloro-6-demethyltetracycline which comprises cultivating a chlortetracycline-producing microorganism of the genus Streptomyces capable of producing 7-chloro-6-demethyltetracycline in an aqueous nutrient medium containing assimilable sources of carbohydrate, nitrogen and inorganic salts under submerged aerobic conditions, said medium having added thereto a small but effective amount of a compound selected from the group consisting of dl-ethionine and l-ethionine.

4. A process for producing 7-bromo-6-demethyltetracycline which comprises cultivating a chlortetracycline-producing microorganism of the genus Streptomyces capable of producing 7-bromo-6-demethyltetracycline in an aqueous nutrient medium containing assimilable sources of carbohydrate, nitrogen and inorganic salts under submerged aerobic conditions, said medium having added thereto a small but effective amount of a compound selected from the group consisting of dl-ethionine and l-ethionine.

5. A process for producing 7-chloro-6-demethyltetracycline which comprises cultivating a chlortetracycline-producing microorganism of the genus Streptomyces capable of producing 7-chloro-6-demethyltetracycline in an aqueous nutrient medium having added thereto a small but effective amount of dl-ethionine.

References Cited by the Examiner

UNITED STATES PATENTS

| 2,739,924 | 3/56 | Lein | 195—80 |
| 2,879,289 | 3/59 | McCormick et al., | 195—80 |
| 2,923,667 | 2/60 | Goodman et al. | 195—80 |

A. LOUIS MONACELL, *Primary Examiner.*

ABRAHAM H. WINKELSTEIN, *Examiner.*